(12) United States Patent
Yang et al.

(10) Patent No.: US 8,945,241 B2
(45) Date of Patent: Feb. 3, 2015

(54) METHOD AND APPARATUS FOR MANUFACTURING METAL SEPARATOR FOR FUEL CELL

(75) Inventors: Dong Yol Yang, Daejeon (KR); Seung Min Ryu, Daejeon (KR); Sae Hoon Kim, Gyeonggi-do (KR); Yoo Chang Yang, Gyeonggi-do (KR); Sang Mun Chin, Seoul (KR); Nam Young Cho, Seoul (KR)

(73) Assignees: Hyundai Motor Company, Seoul (KR); Kia Motors Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 13/563,128

(22) Filed: Jul. 31, 2012

(65) Prior Publication Data
US 2012/0291513 A1 Nov. 22, 2012

Related U.S. Application Data

(62) Division of application No. 12/396,531, filed on Mar. 3, 2009, now Pat. No. 8,241,373.

(30) Foreign Application Priority Data

Oct. 22, 2008 (KR) .......... 10-2008-0103539

(51) Int. Cl.
*H01M 4/82* (2006.01)
*B21D 17/02* (2006.01)
*H01M 8/02* (2006.01)

(52) U.S. Cl.
CPC ............. *B21D 17/02* (2013.01); *H01M 8/0258* (2013.01); *Y02E 60/50* (2013.01)
USPC .......................................... 29/623.1; 29/592.1

(58) Field of Classification Search
CPC .. B21D 17/02; H01M 8/0206; H01M 8/0258; Y02E 60/50
USPC ................................................. 29/631, 623.1
See application file for complete search history.

(56) References Cited

U.S. PATENT DOCUMENTS

2006/0022301 A1    2/2006   Sofue et al.

FOREIGN PATENT DOCUMENTS

| JP | 2000-067882 | 3/2000 |
| JP | 2002-373670 | 12/2002 |
| JP | 2005-203344 | 7/2005 |
| JP | 2006-012462 | 1/2006 |
| JP | 2006-185667 | 7/2006 |
| JP | 2006185667 A | * 7/2006 |

* cited by examiner

*Primary Examiner* — Gary Harris
(74) *Attorney, Agent, or Firm* — Edwards Wildman Palmer LLP; Peter F. Corless

(57) ABSTRACT

The present invention provides an apparatus and method for manufacturing a metal separator for a fuel cell, which can manufacture large-sized metal separators in large quantities using metal plates such as stainless steel by thermoplastic deformation using an incremental and synchronized rubber molding process.

3 Claims, 21 Drawing Sheets

< A-A CROSS-SECTION >

US 8,945,241 B2

METHOD AND APPARATUS FOR MANUFACTURING METAL SEPARATOR FOR FUEL CELL

CROSS-REFERENCE TO RELATED APPLICATION

This application is a divisional application of U.S. application Ser. No. 12/396,531, filed Mar. 3, 2009 which claims under 35 U.S.C. §119(a) the benefit of Korean Patent Application No. 10-2008-0103539 filed Oct. 22, 2008, the entire contents of which are incorporated herein by reference.

BACKGROUND (a) Technical Field

The present disclosure relates to an apparatus and method for manufacturing a metal separator for a fuel cell. More particularly, it relates to an apparatus and method for manufacturing a metal separator for a fuel cell, where the apparatus and method can manufacture large-sized metal separators in large quantities using, for example, metal plates such as stainless steel by thermoplastic deformation using an incremental and synchronized rubber molding process.

(b) Background Art

A polymer electrolyte membrane fuel cell (PEMFC) (also known as a proton exchange membrane fuel cell) has many advantages including a low operation temperature of about 80° C., and high energy efficiency, etc., when compared to other types of fuel cells.

Catalyst layers for promoting oxidation and reduction reactions may be coated on an oxidation electrode (anode) and a reduction electrode (cathode) of the PEMFC. At the oxidation electrode, supplied hydrogen is dissociated into hydrogen ions (protons) and electrons by the oxidation reaction. At the reduction electrode, the dissociated hydrogen ions combine with oxygen to suitably produce water and, at the same time, electric power is suitably generated by the oxidation reaction at the oxidation electrode and the reduction reaction at the reduction electrode.

A separator (also called a bipolar plate) may be used in the PEMFC and has a channel through which hydrogen and oxygen pass, and also functions to separate unit cells that are stacked in a fuel cell stack, and to support a membrane electrode assembly (MEA), and may also act as a current collector for collecting and transmitting generated electricity.

Preferably, the separator should have high electrical conductivity to minimize voltage loss, low gas permeability to prevent the supplied hydrogen and oxygen from permeating, low density, sufficient mechanical strength, excellent corrosion resistance in electrolyte used therein, good productivity, and low manufacturing cost.

FIG. 1 is a configuration diagram showing a fuel cell stack of a polymer electrolyte membrane fuel cell, in which a plurality of unit cell is stacked.

Each of the unit cells preferably comprises a polymer electrolyte membrane (also called a proton exchange membrane). An oxidation electrode (anode) and a reduction electrode (cathode) are suitably formed on both sides of the polymer electrolyte membrane. The polymer electrolyte membrane and the respective electrodes are integrally formed by a hot press, thus forming a membrane electrode assembly (MEA) 10.

Moreover, a gas diffusion layer (GDL) is suitably disposed on the outside of the electrodes of the MEA 10.

The MEAs 10 of adjacent unit cells are separated and supported by a separator 20.

FIG. 2 is a perspective view and a cross-sectional view showing a metal separator of FIG. 1. The metal separator (hereinafter referred to as a separator) 20 preferably has a metal plate structure that may further include fine grooves consisting of concave-convex parts 30 through which hydrogen as fuel and oxygen as oxidant suitably pass. The separator 20 is bonded to the GDL attached to the outside of the MEA.

The separator 20 functions to supply hydrogen to the fuel electrode, remove product water from the air electrode, and transmit generated electricity to an external circuit.

Accordingly, the structural factors such as the depth and width of the fine grooves of the separator may be considered to be important factors that have a considerable effect on the output efficiency of the fuel cell.

A stamping process has been widely studied as a process for manufacturing the separator for the PEMFC.

The stamping process is a simple process that enables mass production; however, in a process of molding a metal plate using an upper punch and a lower die, the shape accuracy of the separator depends on the dimensional accuracy of the punch and the die.

Moreover, during the stamping process of a fine metal pattern in which the upper punch moves down to deform the metal plate, a so-called recoiling phenomenon occurs, in which the flat part of the pattern is recoiled, since the upper and lower dies are in contact with the metal plate in a relatively narrow region of the separator.

After the upper punch has moved down, the deformation is concentrated in a relatively narrow region of the separator such as round parts of the top and bottom of the pattern, and thus excessive thinning occurs in the corresponding region. Furthermore, when the upper punch is removed upon the molding process of the metal plate, a so-called spring-back phenomenon occurs, in which part of the metal plate elastically recovers, and thus it is difficult to ensure the dimensional accuracy.

Further, forming an ultrafine pattern can be difficult, due to low accuracy of the pattern shape according to properties such as non-uniformity and anisotropy of the material and due to limitations in mold manufacturing technology and matching technology. Accordingly, the shape accuracy required by the fuel cell separator may not be satisfied. A new separator manufacturing method, which can minimize the above-described molding defects, is required.

Japanese Patent Publication No. 2006-114443 (the '443 reference herein), incorporated by reference in its entirety herein, is directed to a method for manufacturing a metal separator for a fuel cell using hydrostatic pressure.

The '443 reference teaches a method for manufacturing a metal separator through three examples to improve moldability of a metal plate material, the method including a process of forming a separator with one press stroke using urethane rubber for hydrostatic effect, a hydroforming process of applying hydrostatic pressure by applying liquid pressure to a confined space, and a process of applying hydrostatic pressure by applying liquid pressure to a liquid pressure pocket.

In the process of molding the separator, a metal material is placed on a lower die including a predetermined pattern used to mold the metal material and pressurized using urethane rubber or liquid pressure in a retainer provided at the top, thus forming the pattern on the metal material. As a result, a fine metal pattern can be formed by the above hydrostatic pressure process.

Since the thickness reduction rate of the metal material is uniformly distributed, it is possible to prevent the separator from tearing, which is caused by excessive local thinning which inevitably occurs in the stamping process. Further, since the urethane rubber is used instead of the upper punch made of metal, it is possible to process complex shapes without causing scratches on the surface of the metal plate, and it is also possible to mold a non-metal or coating plate.

The '443 reference is directed to a method for manufacturing a separator including a fine metal pattern formed by pressurizing urethane rubber, which is an elastic material, with one press stroke. However, in examples where a large-sized separator for the PEMFC is designed, a very high load is required, and the manufacturing speed is considerably reduced due to the pressure control for forming uniform fine patterns.

Further, sealing the retainer capable of controlling the liquid pressure by rubber or fluid may be difficult at very high molding pressure.

Further, the more the molding area is increased and the more the pattern shape is complicated with the use of the completely sealed retainer, the more the molding load for material filling is increased.

Accordingly, the process of using hydrostatic pressure to improve the moldability of the metal plate by applying low molding load is an important factor for improving productivity, and, further, the use of an open retainer instead of the completely sealed retainer can be used to optimize the process variables.

Japanese Patent Publication No. 2005-243252 (the '252 reference herein), incorporated by reference in its entirety herein, is directed to a method for manufacturing a metal separator, in which the moldability of the separator is improved by multi-stage molding in a stamping process using a press.

According to the '252 reference, a final separator including a pattern is not manufactured by a one-shot molding process. Instead, a preform is preferably formed by a primary molding process, and the thus formed preform is molded in a secondary molding process by a stamping process using upper and lower dies, thus manufacturing a final separator.

As taught by the '252 reference, the preform is suitably formed by the primary molding process in which an initial material is stamped by predesigned upper and lower molds, and the preform is used for the secondary molding process in which a final pattern is formed by bending and stretching the preform using the upper and lower dies. The use of such a preform may be more effective in improving the moldability of the material during the secondary molding process.

Further, with the use of the stretched preform, it is possible to prevent excessive local thinning, and thus the deformation rate is uniformly distributed.

The pattern shape of the separator taught in the '252 reference is complex, e.g. a serpentine structure, the molding depth is large, and it cannot avoid the above-described recoiling, local thinning, and spring-back, which are the fundamental problems of the stamping process used as a final manufacturing process so as to reduce the round parts and increase the flat part.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides an apparatus and method for manufacturing a metal separator for a fuel cell using an incremental and synchronized rubber molding process, which can prevent spring-back, recoiling, excessive local thinning, and tool wear, which are caused by an existing stamping process, to ensure the dimensional accuracy of a fine pattern of a large-sized separator by applying low molding load, to suitably increase the manufacturing speed, and manufacture large-sized separators in large quantity.

In another aspect, the present invention provides an apparatus for manufacturing a large-sized metal separator for a fuel cell using an incremental rubber molding process, the apparatus comprising: a plurality of low dies having a predetermined pattern formed on an upper surface thereof; a transferring means for pitch-transferring the lower dies in directions opposite to each other; and a pressing means for compression-molding a metal plate placed on the upper surface of each of the lower dies and pitch-transferred, in which the entire area of the metal plate is divided into a plurality of unit areas and the compression molding process is sequentially performed on the respective unit areas.

In a preferred embodiment, the transfer means preferably comprises, but is not limited to, a rail connected to a rail groove formed on a lower surface of the lower die; and a driving unit connected to the lower die and pitch-transferring the lower die a fixed distance.

In another preferred embodiment, the pressing means preferably comprises, but is not limited to, a lower support fixed to both sides of a middle portion of the rail; a retainer connected to the lower support so as to be moved up and down; a compression rubber integrally attached to a lower surface of the retainer; and a driving unit for moving up and down the retainer.

In another aspect, the present invention provides, a method for manufacturing a large-sized metal separator for a fuel cell using an incremental rubber molding process, the method comprising: placing a metal plate on an upper surface of a plurality of lower dies; pitch-transferring the lower dies on which the metal plates are placed, respectively, in directions opposite to each other to a pressing means by a transferring means; and compression-molding the pitch-transferred metal plate placed on the upper surface of each of the lower dies by compression force of the retainer, in which the entire area of the metal plate is divided into a plurality of unit areas and the compression molding process is sequentially performed on the respective unit areas.

In a preferred embodiment, the method further comprises, but is not limited to, placing a preformed metal plate on one of the plurality of lower dies, pitch-transferring the lower die in the forward direction to the pressing means, and performing a primary molding process on the respective unit areas defined by dividing the entire area of the metal plate in the longitudinal direction thereof; and turning upside down and placing the primarily molded metal plate on the other lower die, pitch-transferring the lower die in the backward direction to the pressing means, and performing a secondary molding process on the respective unit areas defined by dividing the entire area of the metal plate in the longitudinal direction thereof.

In another preferred embodiment, in the step of compression-molding the metal plate by the compression force of the retainer, boundaries between the respective unit areas suitably overlap each other.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein:

FIGS. 3 and 4 are diagrams illustrating structures of rubber retainers applicable to an apparatus for manufacturing a separator for a fuel cell in accordance with the present invention, in which FIG. 3 is a perspective view showing a 180° sealed container and FIG. 4 is a perspective showing a completely sealed retainer;

FIGS. 8A to 8M are perspective views showing an apparatus for manufacturing a separator for a fuel cell and a manufacturing method using the same in accordance with the present invention, in which an incremental and synchronized molding process is employed.

Figure 1:
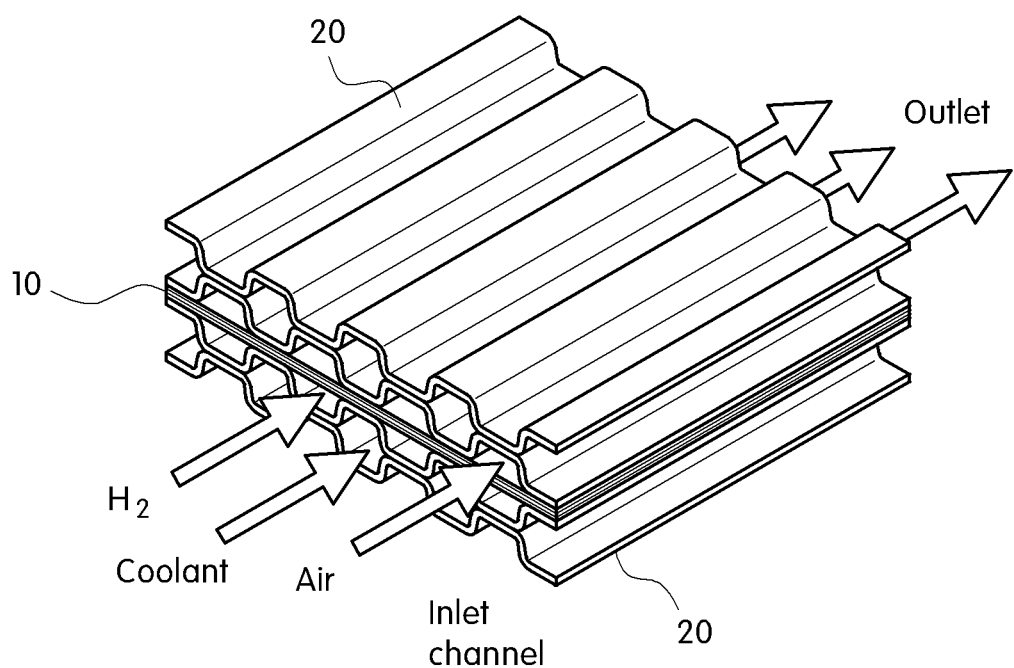
FIG. 1 is a configuration diagram showing a fuel cell stack of a polymer electrolyte membrane fuel cell.
Figure 2:
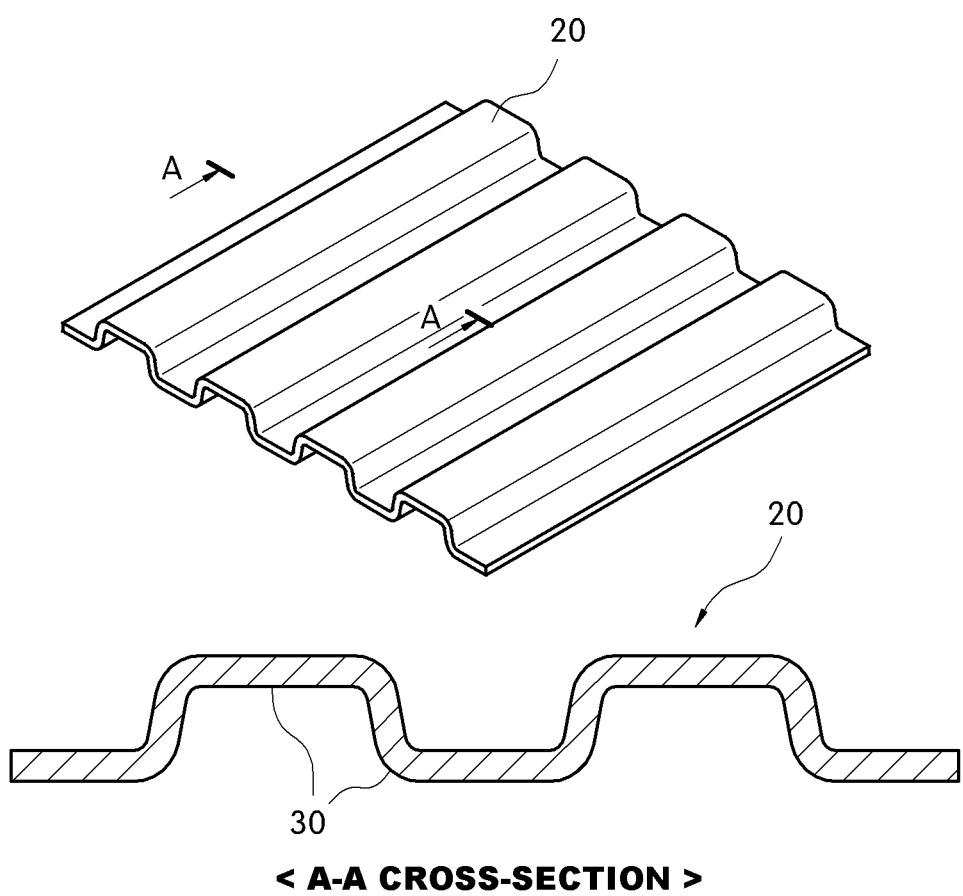
FIG. 2 is a perspective view and a cross-sectional view showing a metal separator of FIG. 1.

Reference numerals set forth in the Drawings includes reference to the following elements as further discussed below:

| | |
|---|---|
| 10: membrane electrode assembly | 20: metal separator |
| 30: concave-convex parts | 40: first lower die |
| 42: second lower die | 44: rail |
| 46: rail groove | 48: pattern |
| 50: metal plate | 52: lower support |
| 54: retainer | 56: compression rubber |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes an apparatus for manufacturing a large-sized metal separator for a fuel cell using an incremental rubber molding process, the apparatus comprising a plurality of low dies, a transferring means, and a pressing means for compression-molding a metal plate placed on the upper surface of each of the lower dies and pitch-transferred.

In one embodiment, the plurality of low dies have a predetermined pattern formed on an upper surface.

In another embodiment, the transferring means is used for pitch-transferring the lower dies in directions opposite to each other.

In a further embodiment, the entire area of the metal plate is divided into a plurality of unit areas and the compression molding process is sequentially performed on the respective unit areas.

In another aspect, the invention features a method for manufacturing a large-sized metal separator for a fuel cell using an incremental rubber molding process, the method comprising placing a metal plate on an upper surface of a plurality of lower dies, pitch-transferring the lower dies on which the metal plates are placed, and compression-molding the pitch-transferred metal plate placed on the upper surface of each of the lower dies by compression force of the retainer.

In one embodiment, the step of pitch transferring further comprises pitch-transferring the lower dies on which the metal plates are placed, respectively, in directions opposite to each other to a pressing means by a transferring means.

In another embodiment, the entire area of the metal plate is divided into a plurality of unit areas and the compression molding process is sequentially performed on the respective unit areas.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides an apparatus and method for manufacturing a metal separator for a fuel cell, in which a plurality of lower dies on which a metal plate is placed is transferred in directions opposite to each other to undergo a sequential molding process by compression of a rubber retainer of a pressing means, thus enabling mass production, improving the accuracy and uniformity of a pattern formed on the separator and used as hydrogen and air flow fields, and preventing the metal separator from warping.

Figure 8A:
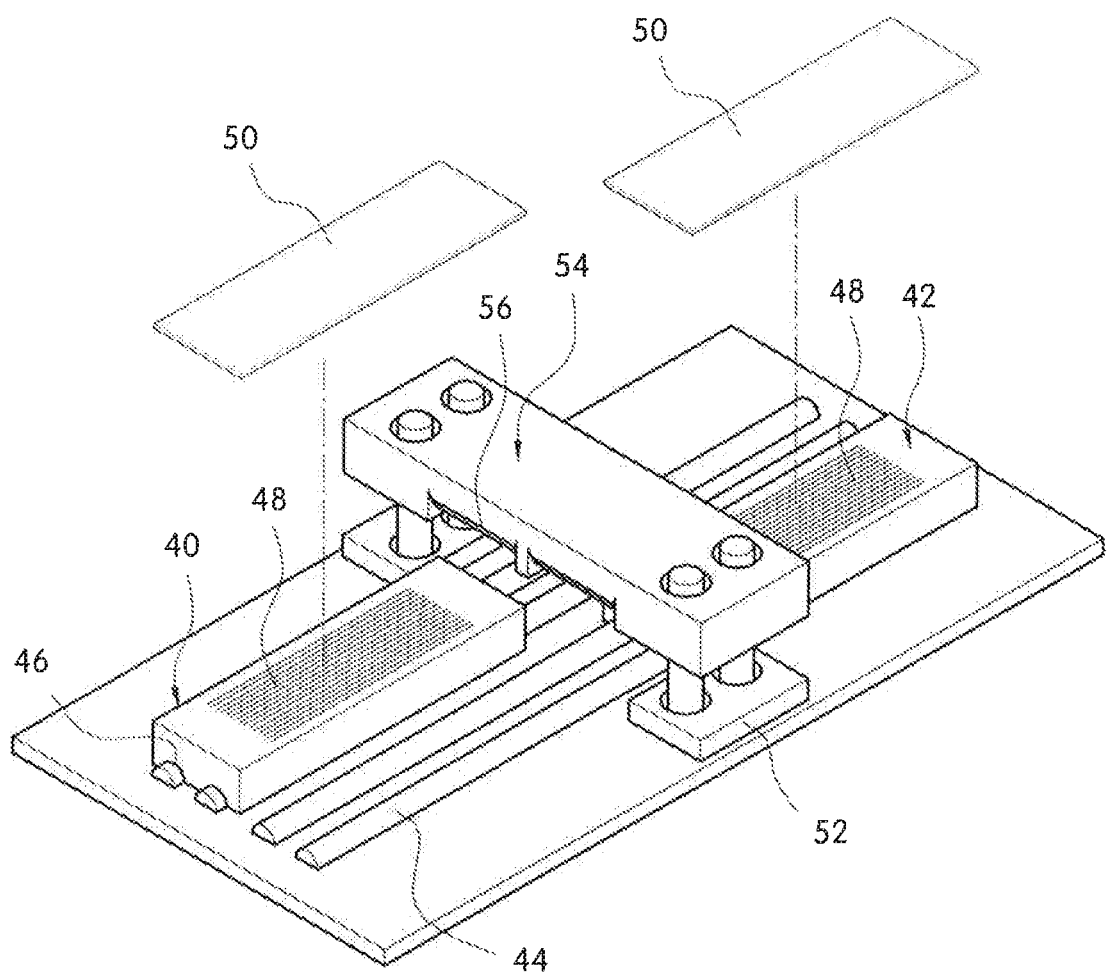

An apparatus for manufacturing a fuel cell separator in accordance with preferred embodiments of the present invention is shown in FIG. 8A.

As shown in FIG. 8A, the apparatus for manufacturing a fuel cell separator preferably includes a plurality of lower dies having a suitably predetermined pattern, which is used for hydrogen, air, and coolant flow, formed on the upper surface thereof. As described herein, the invention features in certain embodiments a first lower die and a second lower die.

In preferred embodiments, the first and second lower dies 40 and 42, each having a predetermined pattern 48 formed on the upper surface thereof, are suitably arranged in parallel on a work plate to be pitch-transferred in directions opposite to each other.

For example, in one embodiment, a pair of rails 44 is suitably mounted on a work plate having a predetermined area and a pair of rail grooves 46 is suitably formed on the lower surface of each of the first and second lower dies 40 and 42 so that the rail grooves 46 of the first and second lower dies 40 and 42 are suitably connected to the rails 44, thus enabling linear movement of the first and second lower dies 40 and 42.

In preferred embodiments, for example, a driving means (not shown) for the linear reciprocating movement of the first and second lower dies 40 and 42 is suitably provided, and, for example, it may be a well-known driving device such as a combination of a ball screw and a servo motor, a combination of a rack and a pinion, etc.; however the driving device may be any device known to one of skill in the art.

In other further embodiments, a pressing means for compressing a metal plate 50 is suitably disposed in a middle portion of the rails 44, and the metal plate 50 is preferably placed on the upper surface of each of the first and second lower dies 40 and 42 and pitch-transferred along with the first and second lower dies 40 and 42.

Figure 3:
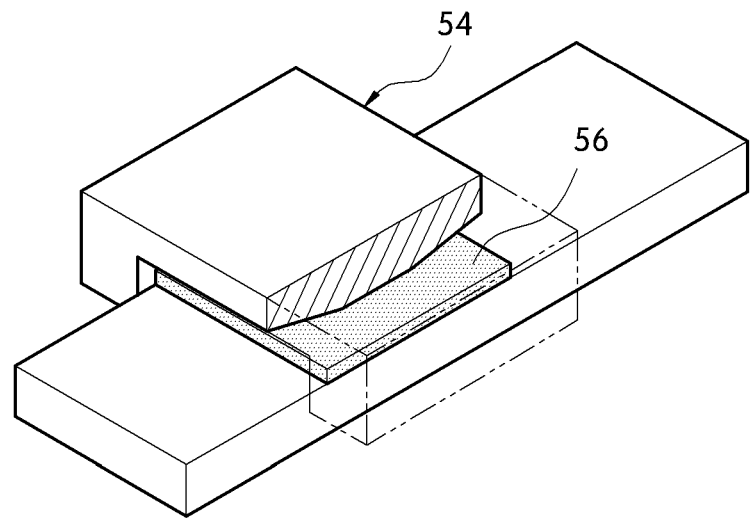
Figure 4:
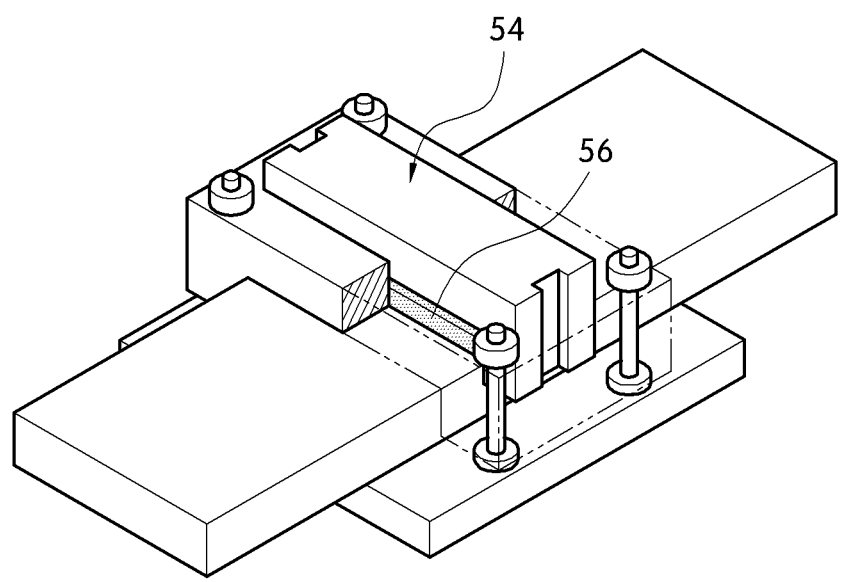

In further embodiments, the pressing means comprises lower supports 52 suitably fixed to both sides of the middle portion of the rails 44, a retainer 54 connected to the lower supports 52 so as to be moved up and down, a compression rubber 56 integrally attached to the lower surface of the retainer 54, and a driving unit (not shown) for moving up and down the retainer 54. In certain embodiments, the driving unit may be, but is not limited to, a hydraulic cylinder, for example In other embodiments of the invention, the retainer 54 adopted by the present invention including the compression rubber 56 integrally attached to the lower surface thereof may preferably be a partially sealed retainer as shown in FIG. 3, in which a surface is suitably opened in the length or width direction of the pattern formed on the first and second lower dies 40 and 42, or a completely sealed retainer as shown in FIG. 4, which suitably blocks the movement of rubber in all directions.

A method for manufacturing a fuel cell separator in accordance with preferred embodiments of the present invention performed based on the above configuration will be described below.

Figure 5:
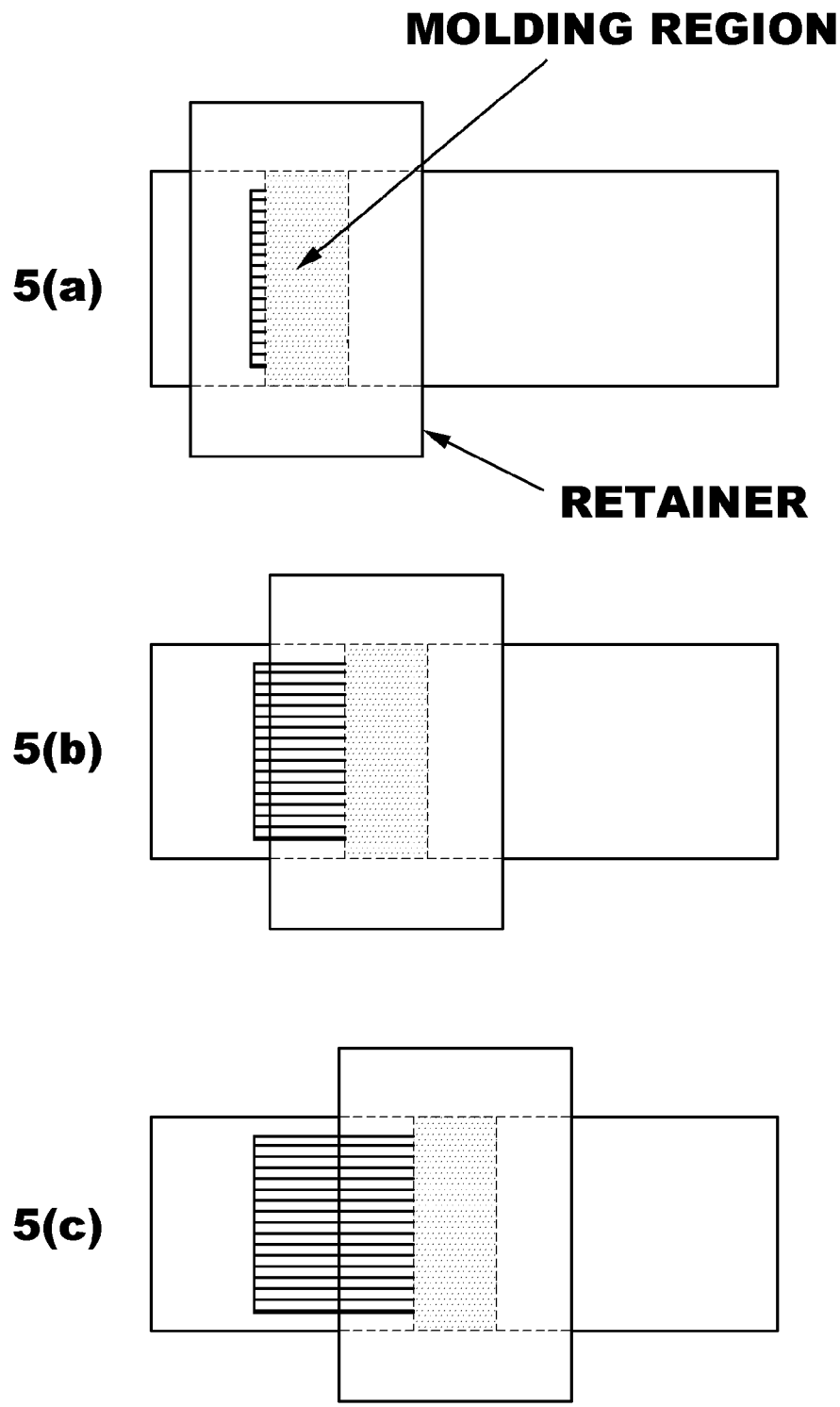
FIG. 5 (A-C) is a schematic drawing that illustrates the basic incremental and synchronized rubber molding process according to certain preferred embodiments of the present invention.

With reference to FIG. 5, in an embodiment of the present invention, the metal plate, preferably the entire area of the metal plate, used to manufacture the fuel cell separator is suitably divided into several unit areas in the longitudinal direction, and the metal plate is subject to incremental and linear movement, for example by unit area toward the pressing region, i.e., pitch-transferred by unit area. Accordingly, in preferred embodiments, since the pitch-transferred unit areas are partially molded in a continuous manner, an excessive load is not required due to the partial molding, the continuity of the pattern shape is easily maintained due to the overlapping molding to the boundary between adjacent unit areas, and thus it is possible to suitably manufacture large-sized metal separators having high accuracy and uniformity in large quantities due to the incremental molding process.

Moreover, in further embodiments of the invention as described herein, by suitably adjusting the size of the retainer, the length of the overlapping region, or the molding load of the retainer during molding for the respective unit area, it is possible to prevent non-molding or spring-back of the pattern, and it is also possible to suitably ensure shape accuracy and uniformity by uniformly maintaining hydrostatic pressure per unit area.

Figure 6:
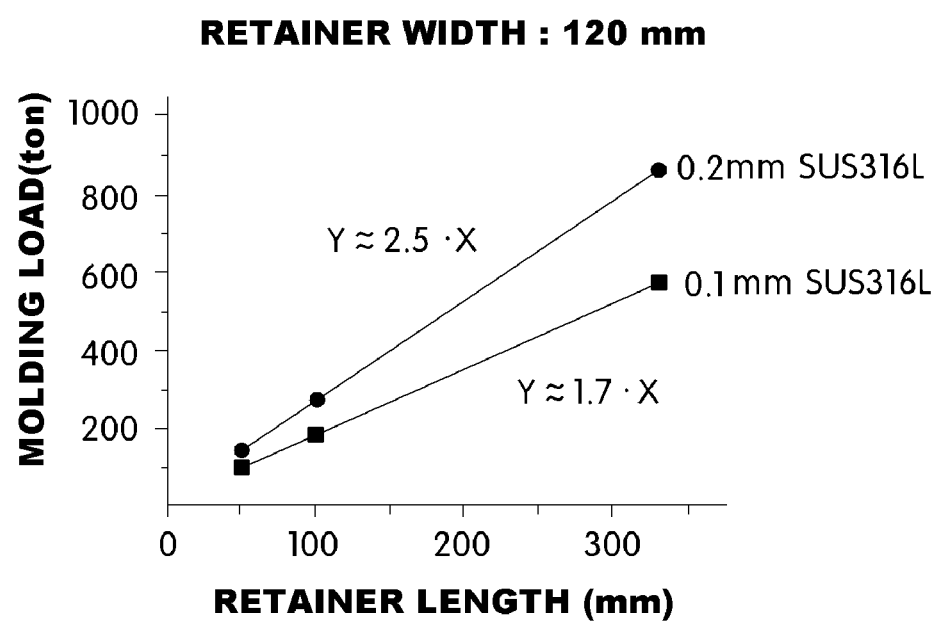
FIG. 6 is a graph showing molding loads according to the size of a rubber retainer for manufacturing a separator for a fuel cell in accordance with the present invention.
Figure 7A:
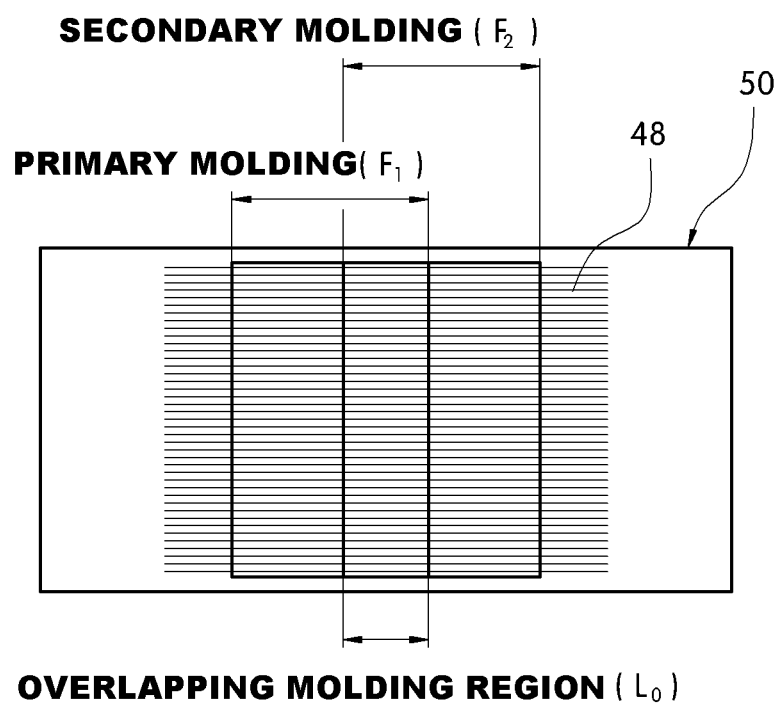
FIG. 7A is a schematic diagram illustrating an overlapping region of a molding process during manufacturing a separator for a fuel cell in accordance with the present invention.
Figure 7B:
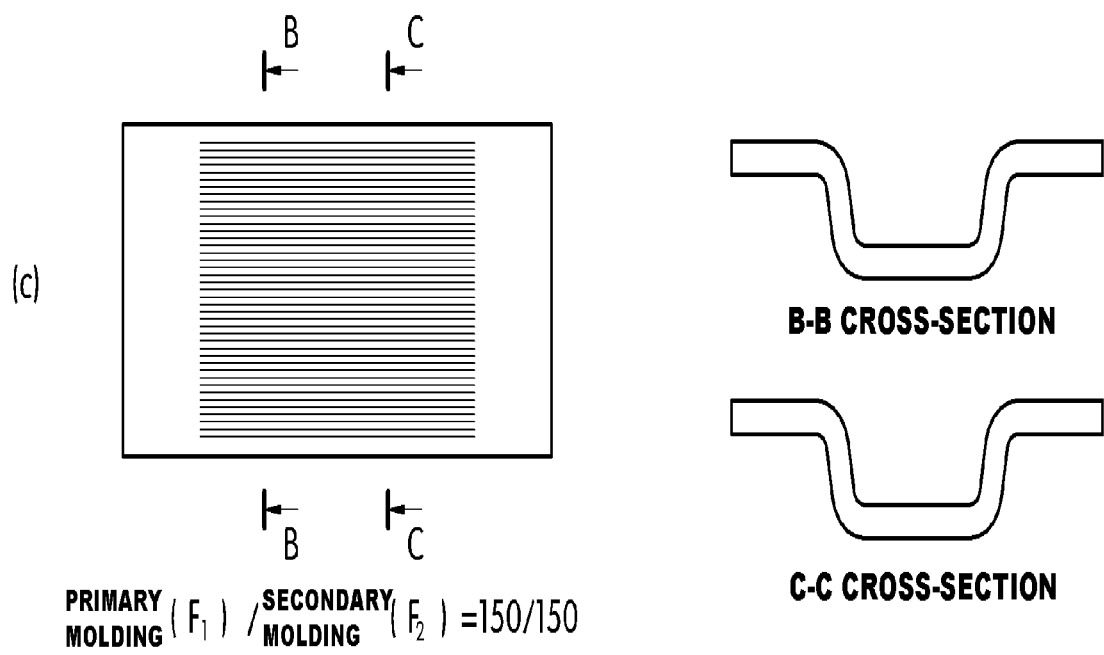
FIG. 7B shows various types of flow fields of the separator formed differently depending on the molding load adjustment.

FIG. 6 shows molding loads variation according to the size of the retainer and thickness of the raw material to be processed. FIG. 7A depicts subsequent molding forces and overlapping molding region; and FIG. 7B shows an exemplary flow field of the separator formed under certain preferred operation parameters: for example, where the first and the second molding force is 150 ton and the length of the overlapping molding region is 10 mm.

The method for manufacturing a fuel cell separator in accordance with preferred embodiments of the present invention for obtaining the above-described effects will be described in more detail with reference to FIGS. 8A to 8M below. As shown in FIG. 8A, the first and second dies 40 and 42, on which the patterns 48 for forming hydrogen/air/coolant flow fields are suitably formed, are preferably disposed at the outside of the retainer 54, respectively.

Figure 8B:
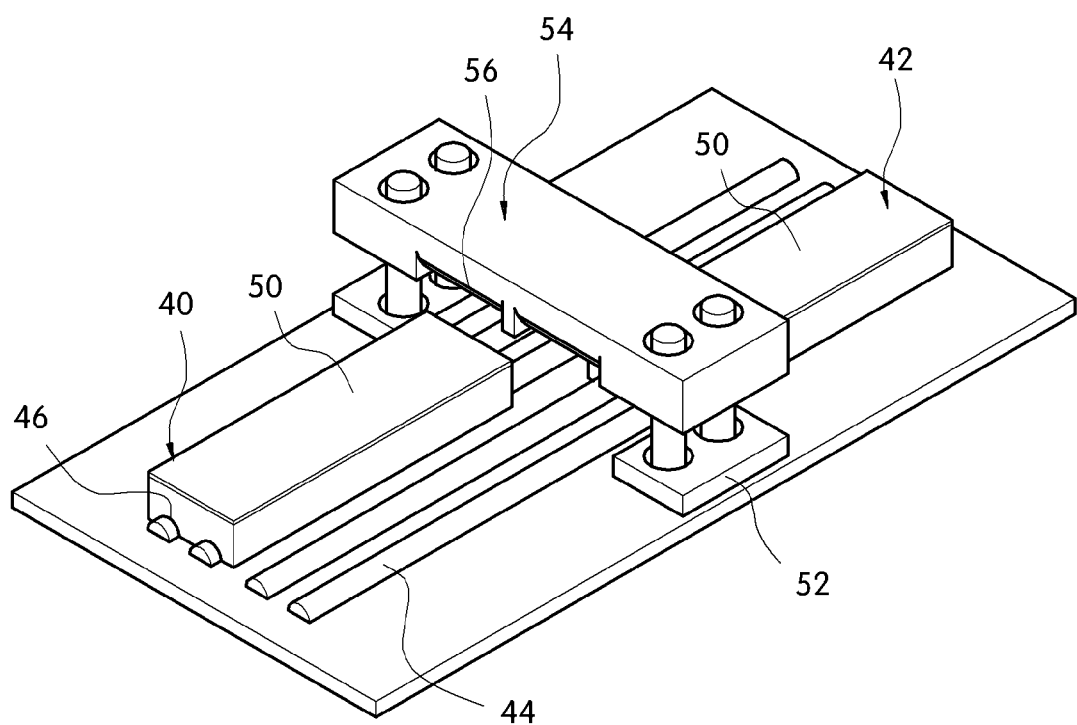
Figure 8C:
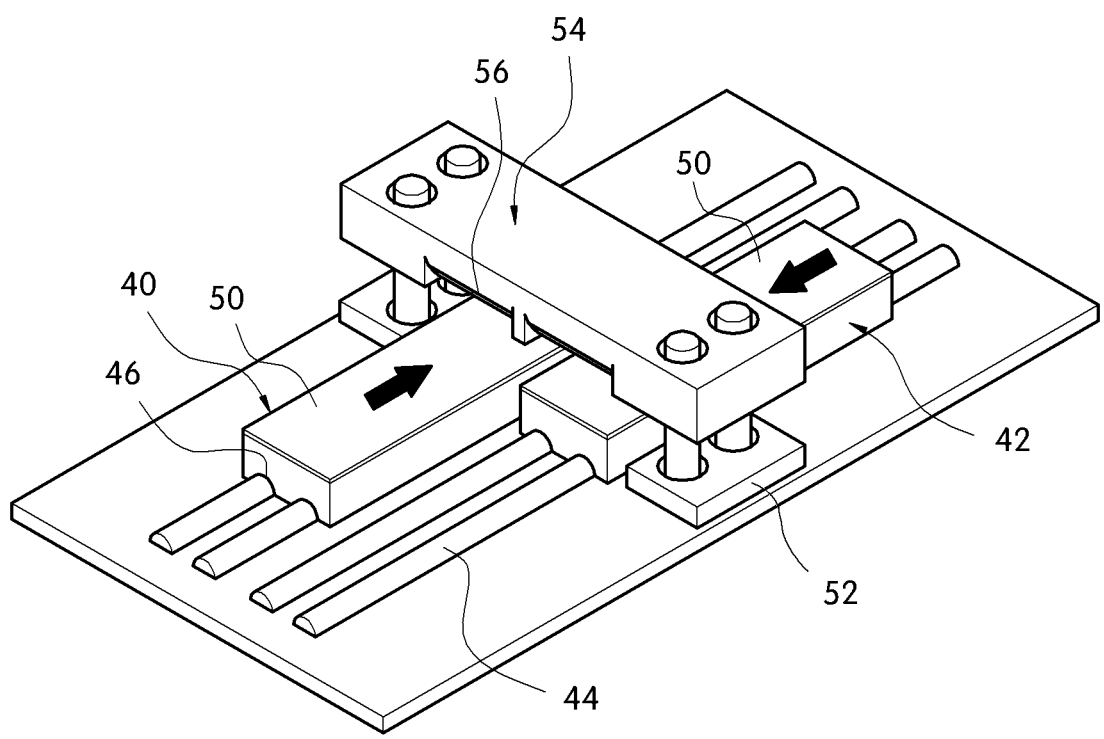

As shown in FIG. 8B, the metal plates 50 are preferably placed on the first and second lower dies 40 and 42 positioned opposite to each other. As shown in FIG. 8C, the first and second lower dies 40 and 42 positioned opposite to each other are suitably pitch-transferred to the bottom of the retainer 54 by a transferring means for the purpose of a primary molding process.

According to further preferred embodiments, the first and second lower dies 40 and 42 are pitch-transferred and, at the same time, a first unit area among several (for example, in certain embodiments, preferably three) unit areas, defined by dividing the entire area of the metal plate 50 in the longitudinal direction thereof, is suitably transferred to the pressing region, i.e., to the bottom of the retainer 54.

Figure 8D:
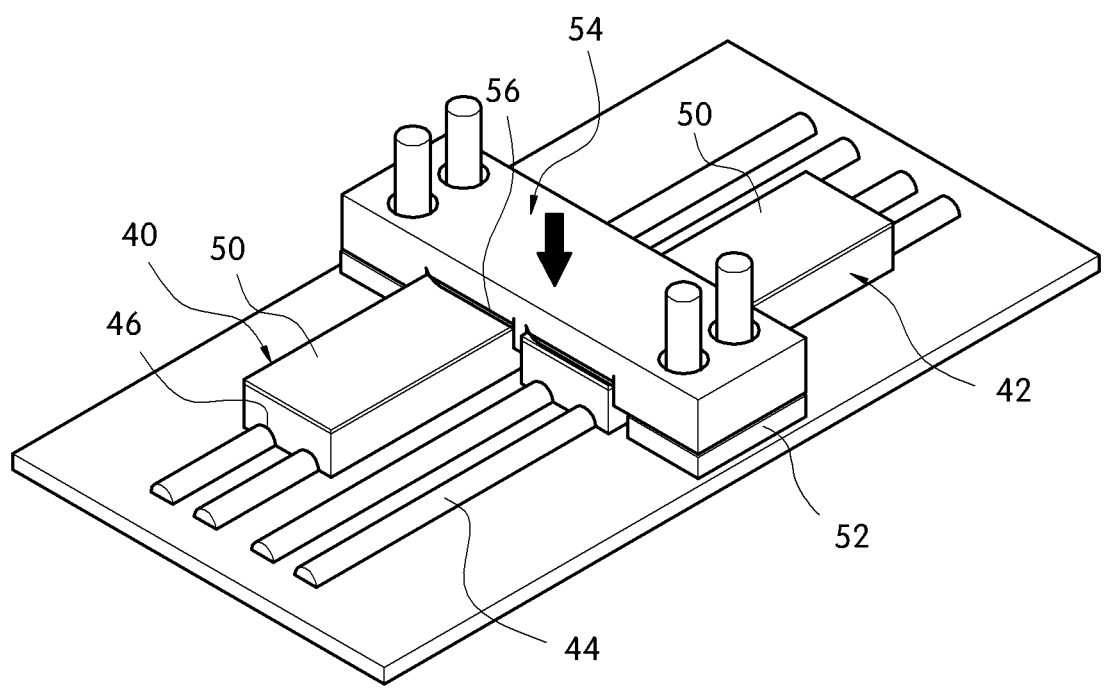

Next, in further embodiments, for example as shown in FIG. 8D, the retainer 54 is preferably moved down to perform the primary molding process on the first unit area of the metal plate 50.

In certain exemplary embodiments, the pressurizing force according to the movement of the retainer 54 is suitably transmitted to the metal plate 50 by the compression rubber 56 attached to the bottom thereof and, at the same time, the lower surface of the metal plate 50 is compressed to the patterns 48 of the first and second lower dies 40 and 42, thus completing the primary molding process for the metal plate 50.

Figure 8E:
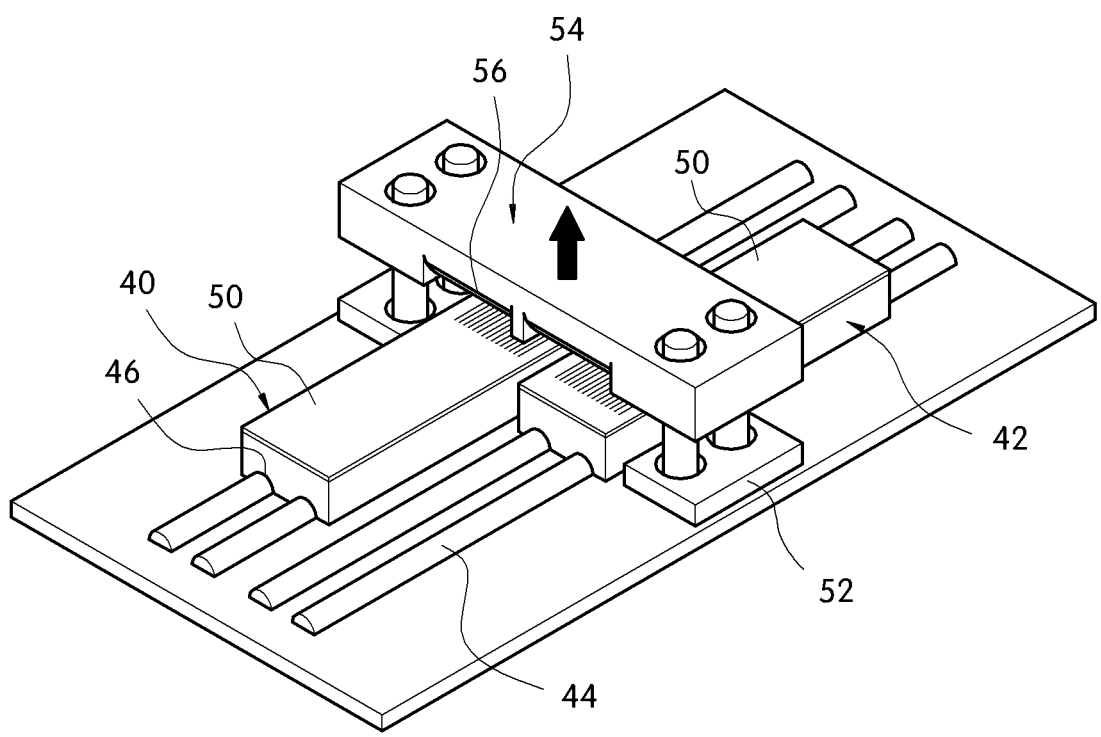

Accordingly, upon the primary molding process, the retainer 54 is moved up as shown in FIG. 8E.

Figure 8F:
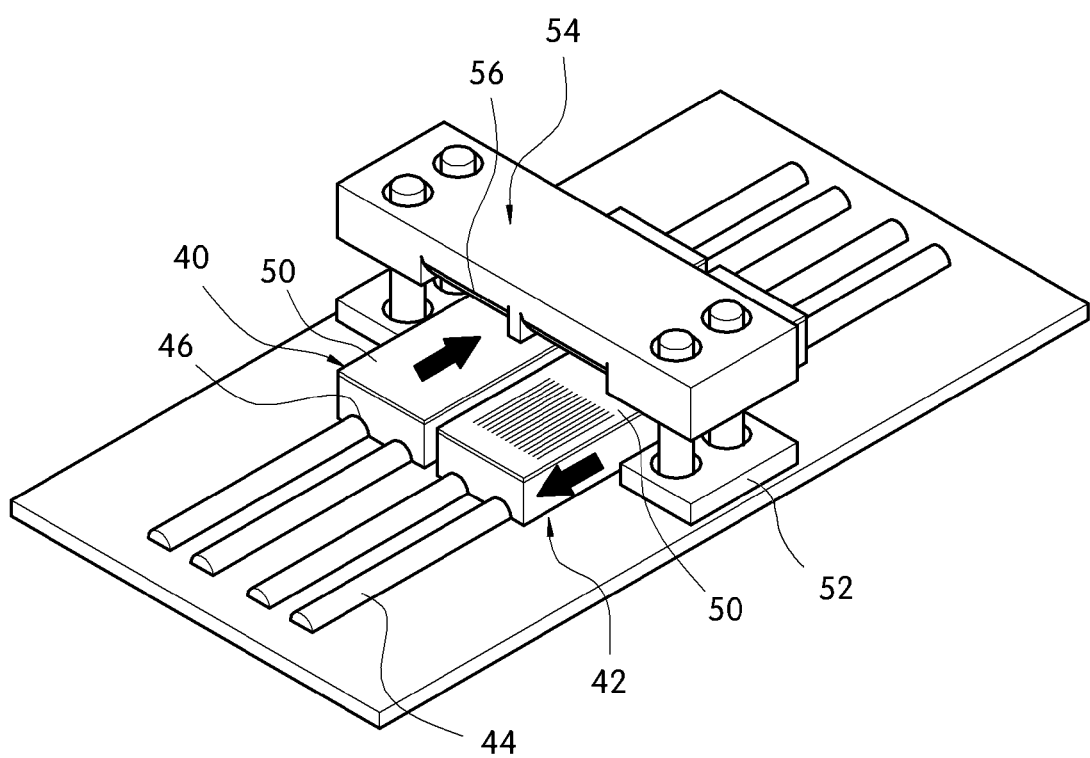

Subsequently, as shown in FIG. 8F, the first and second lower dies 40 and 42 disposed opposite to each other are suitably pitch-transferred again to the bottom of the retainer 54 by the transferring means for the purpose of a secondary molding process.

According to further embodiments of the invention, the first and second lower dies 40 and 42 are pitch-transferred again and, at the same time, a second unit area among several (preferably three) unit areas, defined by dividing the entire area of the metal plate 50 in the longitudinal direction thereof, is suitably transferred to the pressing region, i.e., to the bottom of the retainer 54.

Figure 8G:
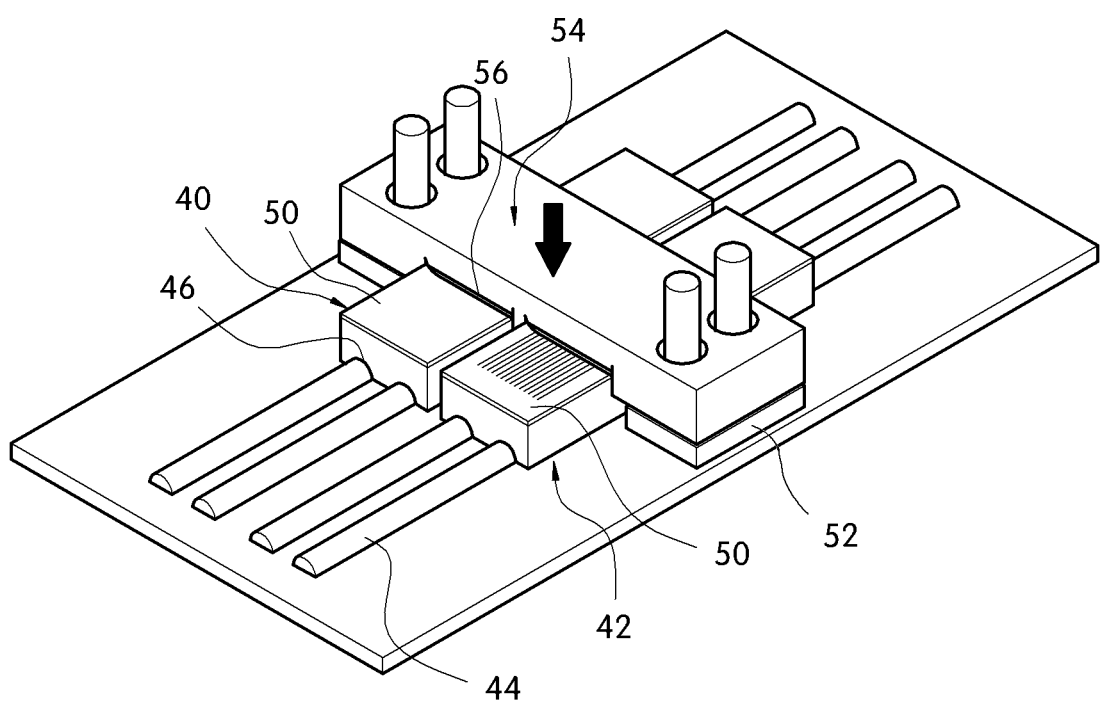

According to exemplary embodiments, and as shown in FIG. 8G, the retainer 54 is moved down again to perform the secondary molding process on the second unit area of the metal plate 50.

Figure 8H:
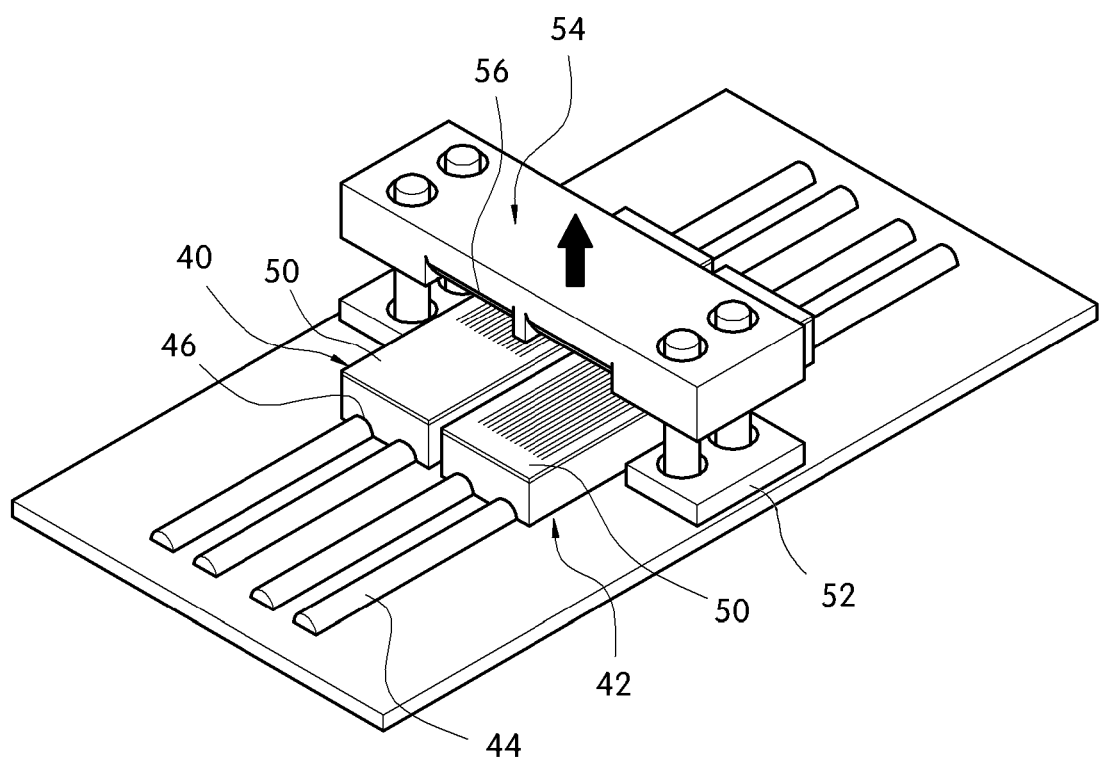

Upon the secondary molding process, the retainer 54 is suitably moved up again as shown in FIG. 8H.

Figure 8I:
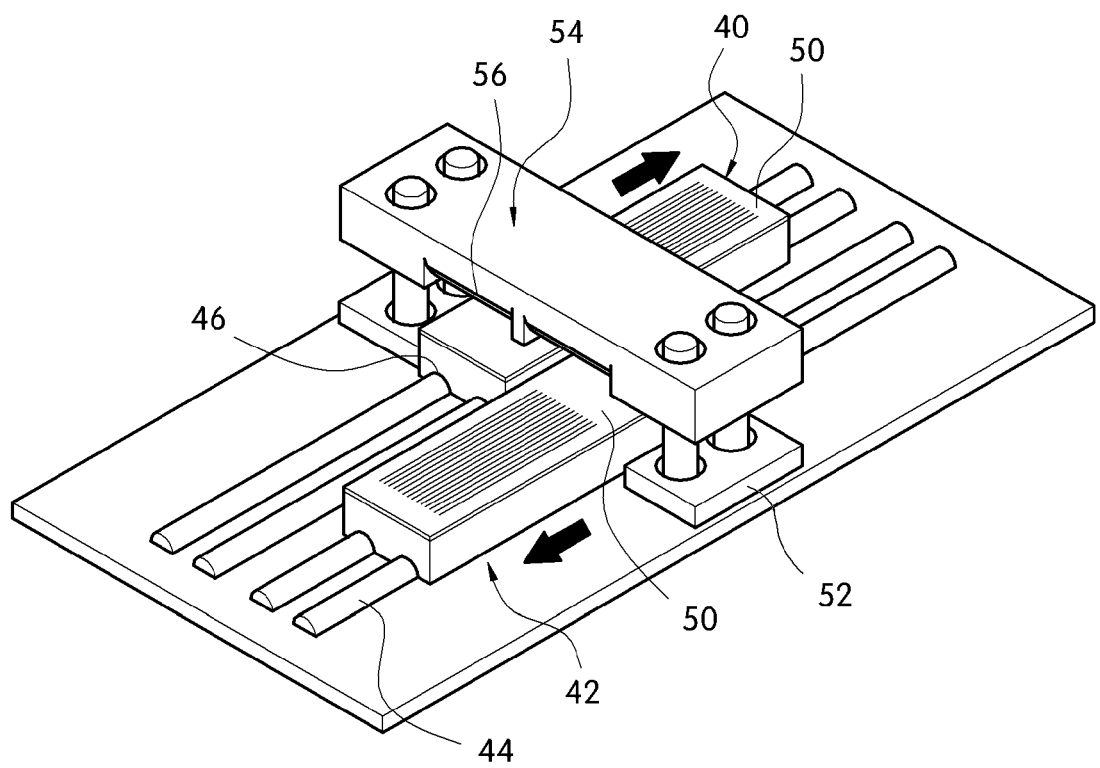

Subsequently, as shown in FIG. 8I, the first and second lower dies 40 and 42 disposed opposite to each other are pitch-transferred again to the bottom of the retainer 54 by the transferring means for the purpose of a tertiary molding process.

Preferably, the first and second lower dies 40 and 42 are pitch-transferred again and, at the same time, a third unit area among several (preferably three) unit areas, defined by dividing the entire area of the metal plate 50 in the longitudinal direction thereof, is transferred to the pressing region, i.e., to the bottom of the retainer 54.

Figure 8J:
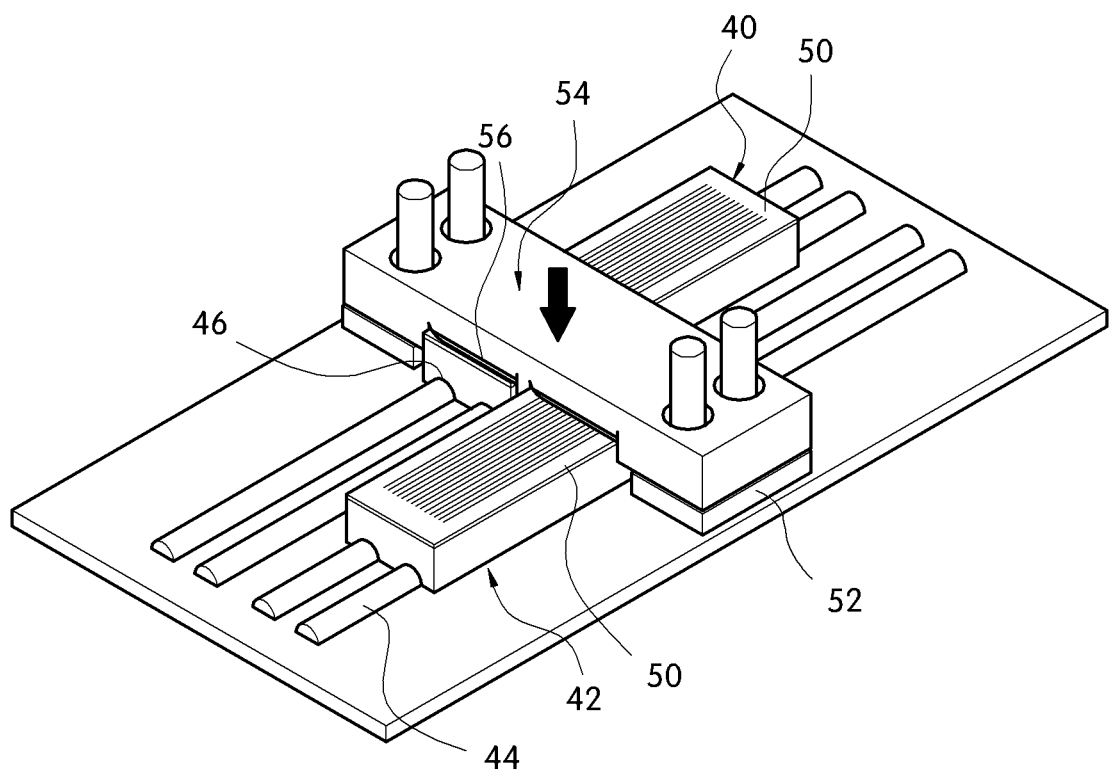

According to further exemplary embodiments, for example as shown in FIG. 8J, the retainer 54 is moved down again to perform the tertiary molding process on the third unit area of the metal plate 50.

Figure 8K:
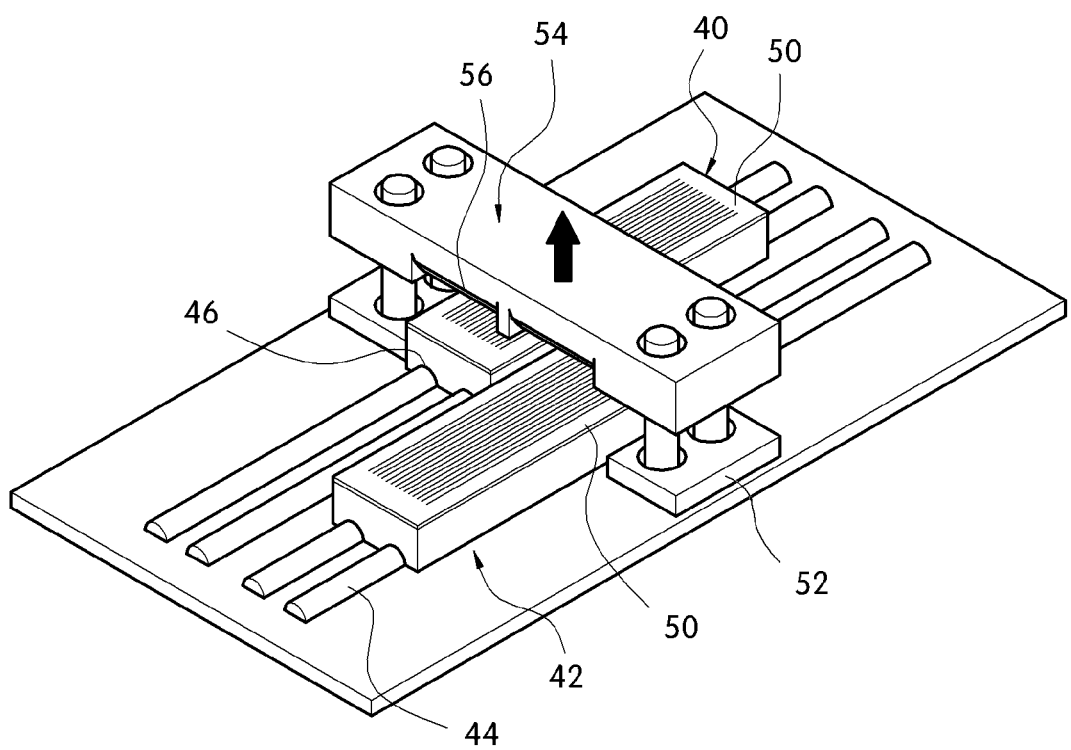
Figure 8I:
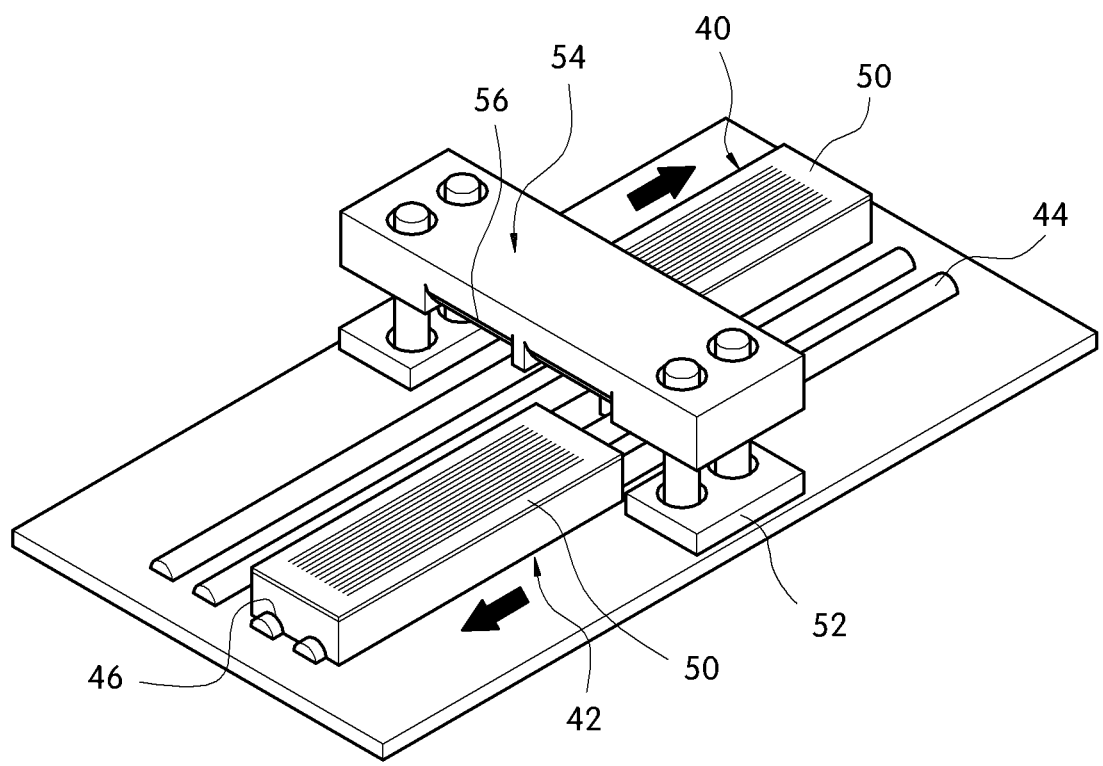

Upon the tertiary molding process, the retainer 54 is moved up again as shown in FIG. 8K.

After the above processes, the first and second lower dies 40 and 42 are transferred in directions opposite to each other, i.e., to the outside of the retainer 54 in order to unload the thus formed metal separators 20 as shown in FIG. 8L.

Figure 8M:
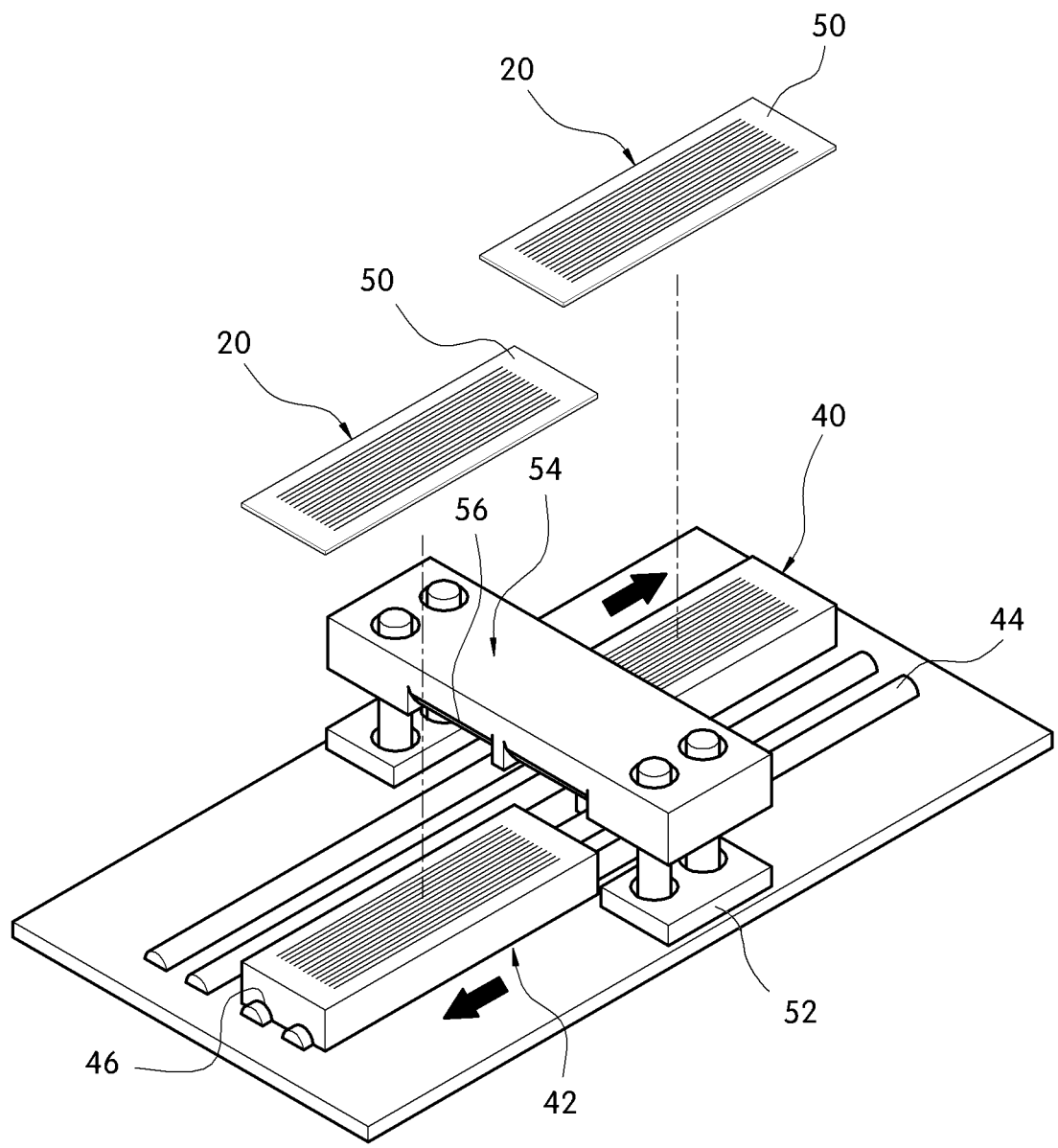

In another embodiment of the invention, and as shown in FIG. 8M, the thus formed metal separators 20 are suitably unloaded from the first and second lower dies 40 and 42.

Accordingly, by repeatedly performing the above processes, it is possible to suitably manufacture the metal separators in large quantities. Although the above processes are performed on the three unit areas, in certain preferred embodiments they may be performed in various ways using any suitable combination of the molding load and the molding area by optimization of the unit areas of the metal plate.

As shown in FIGS. 6 and 7, according to preferred embodiments of the invention as described herein, it is possible to accurately obtain the shape of the flow fields for a large-sized metal separator and easily manufacture the metal separators in large quantities by suitably adjusting the size and the molding load of the retainer including the compression rubber.

In another preferred embodiment of the present invention, a process of forming a metal plate into a preform shape and manufacturing a metal separator using the same, in which one side of the metal plate and the other side thereof are sequentially molded to improve the accuracy, will be described with reference to FIG. 9.

Figure 9:
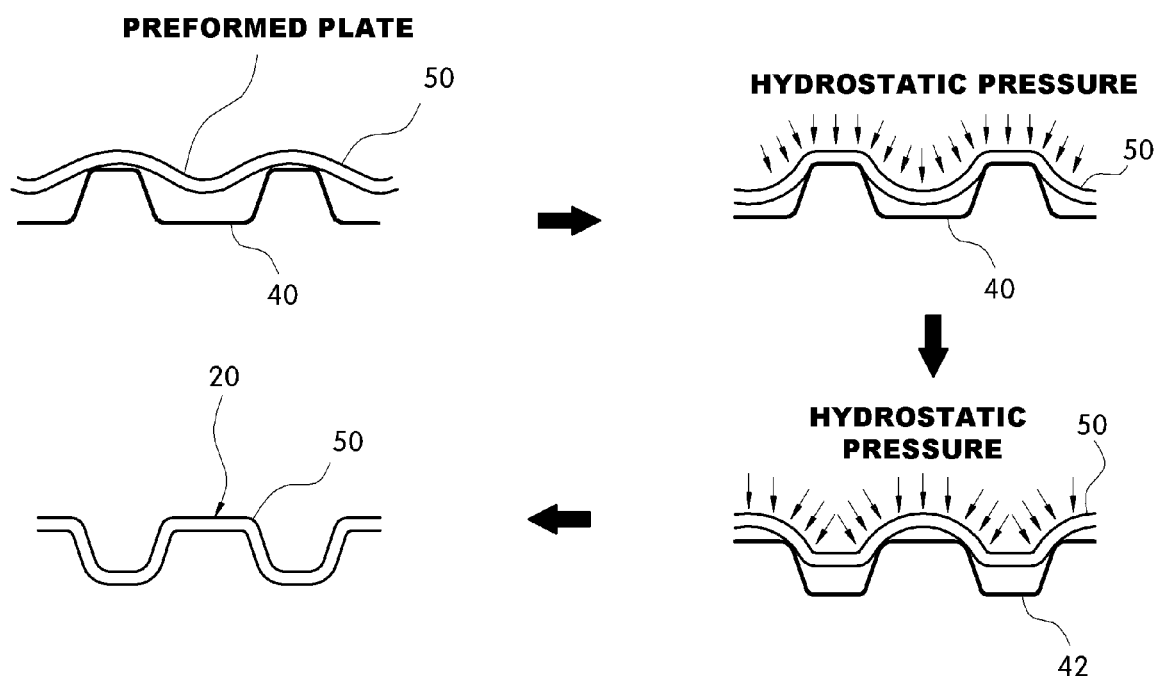
FIG. 9 is a conceptual diagram illustrating a process of forming a metal plate into a preform shape and manufacturing a metal separator using the same, in which one side of the metal plate and the other side thereof are sequentially molded to improve the accuracy.

As shown in FIG. 9, a metal plate 50 is preferably formed into a preform shape having an incomplete pattern by a suitable stamping process. Then, the metal plate 50 having the preform shape is placed on the first lower die 40 and pitch-transferred to undergo a primary molding process by pressurization of the retainer 54. Subsequently, the primarily molded metal plate 50 is turned upside down and placed on the second lower die 42 and pitch-transferred to undergo a secondary molding process by the retainer.

According to further preferred embodiments, since both sides of the metal plate 50 are molded by the primary and secondary molding processes in the above manner, it is possible to suitably prevent the thus finally formed large-sized metal plate from warping.

As described above, the present invention provides the following effects.

According to the method for manufacturing a large-sized metal separator for a fuel cell using an incremental and synchronized rubber molding process of the present invention, as described herein, in which a plurality of lower dies on which a metal plate is placed is transferred in directions opposite to each other and a compression molding process by a rubber retainer is sequentially performed on the respective unit areas of the metal plate, it is possible to suitably enable production and improve the accuracy and uniformity of a pattern formed on the separator and used as hydrogen and air flow fields.

Accordingly, a primary molding process is performed on the metal plate, which is preferably placed on one of the plurality of lower dies and transferred in one direction, and a secondary molding process is performed on the primarily molded metal plate, which is preferably turned upside down, placed on the other lower die, and transferred in the other direction, thus preventing the large-sized metal separator from warping.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a large-sized metal separator for a fuel cell using an incremental rubber molding process, the method comprising:
    placing a metal plate on an upper surface of a plurality of lower dies disposed horizontally adjacent to each other;
    pitch-transferring the lower dies on which the metal plates are placed, respectively, in directions horizontally opposite each other along rails mounted on a working plate to a pressing means by a transferring means; and
    compression-molding the pitch-transferred metal plate placed on the upper surface of each of the lower dies by compression force of the retainer.

2. The method for manufacturing a large-sized metal separator for a fuel cell using an incremental rubber molding process of claim 1, wherein the step of pitch transferring further comprises pitch-transferring the lower dies on which the metal plates are placed, respectively, in directions opposite to each other to a pressing means by a transferring means.

3. The method for manufacturing a large-sized metal separator for a fuel cell using an incremental rubber molding process of claim 1, wherein the entire area of the metal plate is divided into a plurality of unit areas and the compression molding process is sequentially performed on the respective unit areas.

* * * * *